Oct. 13, 1959     J. W. HACKETT     2,908,034

METHOD AND APPARATUS FOR MAKING BLOWN PLASTIC ARTICLES

Filed Oct. 5, 1956

INVENTOR.
JAMES W. HACKETT
BY W. A. Debaich
Leonard D. Ambro
ATTORNEYS

United States Patent Office 2,908,034
Patented Oct. 13, 1959

2,908,034
METHOD AND APPARATUS FOR MAKING BLOWN PLASTIC ARTICLES

James W. Hackett, Toledo, Ohio, assignor to Owens-Illinois Glass Company, a corporation of Ohio Application October 5, 1956, Serial No. 614,272

3 Claims. (Cl. 18—5)

This present invention relates to the manufacture of blown plastic containers and in particular, to the method of making containers wherein the body portions thereof are blown from extruded tubular forms of plastic material heated and of a consistency capable of further working subsequent to the extrusion thereof.

In the manufacture of plastic containers by any one of the several methods which include the step of expanding a tubular parison by blowing, it is the usual practice to close or seal one end of the extruded tube, prior to such blowing, by pinching the same between the halves of the blow mold. This operation closes the end of the tube by heat-sealing and at the same time nearly severs the pinched portion so that later the tail formed by such pinching, may be easily separated from the blown container.

This method of closing the end of the tube invariably has an adverse effect upon the thickness control of the wall or bottom portion of the container. This closing action flattens and squeezes out the tube or parison so that in the direction of the length of the pinch-off line the parison is nearly in contact with the outer walls of the blow mold before expansion, while in a direction of 90° to this pinch-off line, the diameter of the parison is actually less than the diameter of the original tube.

When the parison is expanded this unequalized pinching action produces a heavy wall thickness in the extended line of the pinching and a much thinner wall at 90° thereto when the parison is stretched during the blowing operation. This difference in wall thickness is such that a ratio of maximum to minimum wall thickness may exist as high as 6:1, and this effect becomes more pronounced as the initial diameter of the extruded parison approaches the ultimate diameter of the finally blown bottle. By providing restriction to the spread of the parison at the point or area of pinch-off, the distribution of material in the bottom wall portions of the blown bottle may be readily controlled. Further, this restriction of spread also prevents uneven bottom surfaces on the blown containers particularly after the pinched tail is removed therefrom.

It is the primary object of this invention to minimize this condition of poor distribution of material in the bottoms of blown containers by controlling the amount of the spread of the tube at the pinch-off area.

It is a further object to control the regularity or evenness of the bottoms of the blown containers.

Other objects will be in part apparent and in part pointed out hereinafter.

Figure 1:
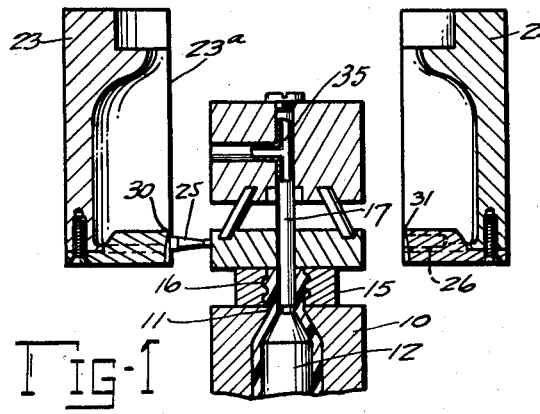
Fig. 1 illustrates the forming of the neck finish of a bottle, and the cooperative relationship between the neck mold, extruder and blow mold.

Referring to the drawings, 10 indicates the usual extruder provided with a nozzle opening 11 and a center flow control mandrel member 12 adapted to regulate the diameter and quantity of plastic material permitted to be extruded therefrom in heated workable condition.

By reference to Fig. 1 it will be noted that the neck mold 15 is seated in aligned position with the nozzle 11, and plastic material under pressure has been filled into the cavity 16 of the split neck mold 15. A hollow neck mold plunger 17 which extends through the cavity 16 into contact with mandrel 12, provides the initial blow opening through the neck portion of ultimate container.

Figure 2:
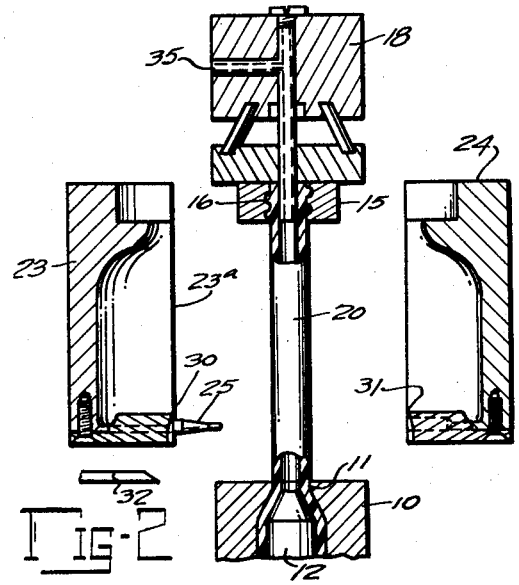
Fig. 2 illustrates the completion of the extrusion of the tubular parison and with the blow mold about to close.
Figure 5:
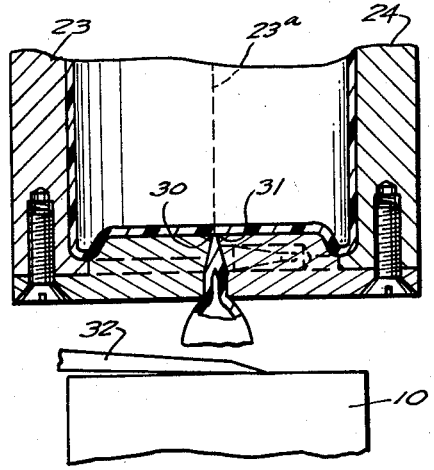
Fig. 5 illustrates the regularity of distribution of the plastic material in the bottom wall portions of the container subsequent to the blowing.
Figure 3:
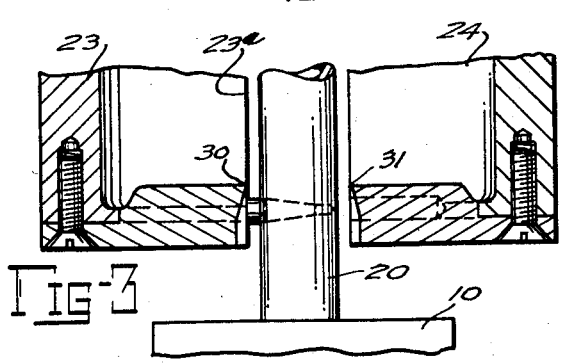
Fig. 3 shows a partial section of the blow mold halves approaching the closed position with one of the parison restraining fingers passing along the side of the parison.

With the completion of the filling of the neck cavity 16 the head 18 and neck mold 15 will be moved away from the nozzle 11 and simultaneous therewtih a hollow tubular parison 20 is extruded from the nozzle 11 until a parison of sufficient length has been extruded for a particular size bottle. (See Fig. 2.)

Figure 4:
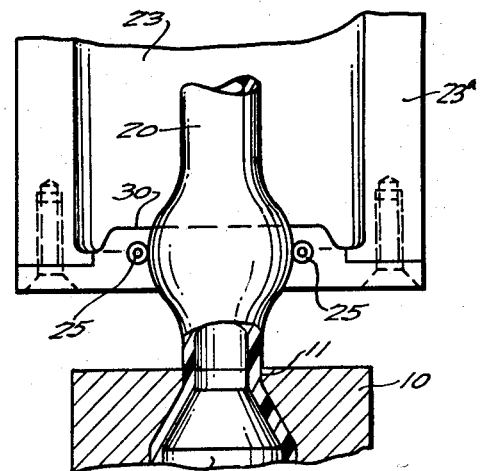
Fig. 4 is a view taken at a line along the face of one of the blow mold halves and illustrates the position and restricted condition of the pinched portion of the parison when the molds are closed and prior to blowing.

With the completion of the extrusion of the parison 20 or tubular body, the blow mold halves 23 and 24 will move toward closed position. The mold half 23 is provided with a pair of guide pins 25 adapted to enter openings 26 in the mold half 24 and these pins and opening are concentrically spaced from the center line of each mold half. Thus, as the mold halves 23 and 24 move toward each other in closed position, the extended ends of the pins 25 will precede the face 23ª of mold half 23 and encompass the sides of the hollow parison 20 prior to any contact as between the parison and the pinching edges 30 and 31 of the mold halves 23 and 24. As the mold halves 23 and 24 further approach closed position the hollow parison 20 will begin to be pinched therebetween and will begin to be flattened and will elongate along the length of the pinching edges 30 and 31 until it has flattened sufficiently to contact the pins 25 (as shown in Fig. 4). With the inception of this restriction of the flattening of the plastic parison by the pins 25, the plastic material of the parison will flow or be displaced at right angles to the previous spreading or flattening movement thereof, thus preventing the thinning action of the meeting point of edges 30 and 31 whihc is usually present in such flattening operations, thereby controlling distribution of the plastic material and wall thickness at this point.

By control of the spacing between the pins 25, the distribution of material in the walls of the blown article, at the meeting point of the two mold halves may be controlled to any desired thickness ratio with respect to the thickness of the walls at the diametrically opposite points at right angles thereto.

With the completion of the closing of the mold halves 23 and 24, a knife 32 is moved across the nozzle opening 11 to sever the parison or tubular body 20 from the material in the nozzle 11. Air under pressure is then admitted through opening 35 in the hollow plunger 17 into the parison or tubular body 20 to expand it to the confines of the mold halves 23 and 24 and its ultimate shape. The closed mold and the blown article are then removed, the neck mold 15 is again seated upon the nozzle 11 and the cycle of operations is again repeated in succession.

Modifications may be resorted to within the spirit and scope of the appended claims.

I claim:

1. The method of controlling the wall thickness of specific portions of a blown plastic article which comprises forming a length of hollow tubular body by the combined injection and extrusion thereof from a source of material supply, said method including the steps of providing a blow mold having a cavity substantially greater in cross-section than that of the tubular body, pinching said hollow length between the halves of the blow mold, thereby simultaneously flattening and sealing an end thereof, the lateral length of said flattened end portion being controllably limited by restraining lateral deformation thereof to less than half the circumference of the tubular body, severing said sealed length from said material source, and blowing said length to final form while the flattened end portion of the body is so restrained.

2. In an apparatus for sealing extruded hollow plastic parisons, the combination of a pair of cooperable mold halves forming a cavity substantially greater in cross-section than that of a parison, said mold halves having pinching members at one end thereof adapted to pinch and seal said extruded parisons and abutment means formed on at least one of said members adapted to restrict the active length of the pinching area of said members, said means being disposed intermediate the parison and the wall of said cavity adjacent one end of said mold halves.

3. In an apparatus for sealing extruded hollow plastic parisons, the combination of a pair of cooperable mold members forming a cavity substantially greater in cross-section than that of a parison, said mold halves having means at one end thereof adapted to pinch and seal said extruded parisons, and extending guide means formed on at least one of said members adapted to restrict the lateral length of the active pinching area of said members, said guide means comprising a pair of abutments disposed on opposite sides of the parison between the walls of said cavity and the parison adjacent said one end, said abutments being spaced apart a distance less than half the circumference of said tubular body.

References Cited in the file of this patent

UNITED STATES PATENTS

| | | |
|---|---|---|
| 1,948,605 | Whitehouse | Feb. 27, 1934 |
| 2,262,612 | Kopitke | Nov. 11, 1941 |
| 2,288,454 | Hobson | June 30, 1942 |
| 2,503,171 | Power | Apr. 4, 1950 |
| 2,562,523 | Brunet | July 31, 1951 |
| 2,579,390 | Mills | Dec. 18, 1951 |
| 2,710,987 | Sherman | June 21, 1955 |
| 2,783,503 | Sherman | Mar. 5, 1957 |
| 2,787,023 | Hagen et al. | Apr. 2, 1957 |

FOREIGN PATENTS

| | | |
|---|---|---|
| 592,590 | Great Britain | June 10, 1953 |
| 937,078 | Germany | Dec. 29, 1955 |